United States Patent
Funayama

(10) Patent No.: US 8,953,273 B1
(45) Date of Patent: Feb. 10, 2015

(54) MAGNETIC DISK APPARATUS

(71) Applicant: Kabushiki Kaisha Toshiba, Minato-ku, Tokyo (JP)

(72) Inventor: Tomomi Funayama, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/482,085

(22) Filed: Sep. 10, 2014

(30) Foreign Application Priority Data

Jun. 30, 2014 (JP) .................. 2014-134094

(51) Int. Cl.
  *G11B 5/02* (2006.01)
(52) U.S. Cl.
  USPC ............................... 360/68; 360/46
(58) Field of Classification Search
  None
  See application file for complete search history.

(56) References Cited

U.S. PATENT DOCUMENTS

| | | | |
|---|---|---|---|
| 6,650,493 B2 | 11/2003 | Dakroub | |
| 7,791,829 B2 | 9/2010 | Takeo et al. | |
| 8,027,118 B2 | 9/2011 | Ezawa et al. | |
| 8,670,201 B2 | 3/2014 | Matsubara et al. | |
| 2010/0232053 A1 | 9/2010 | Yano et al. | |
| 2013/0063837 A1* | 3/2013 | Udo et al. | 360/75 |
| 2013/0083423 A1* | 4/2013 | Shiroishi et al. | 360/75 |
| 2013/0279039 A1* | 10/2013 | Shiroishi | 360/48 |
| 2014/0168808 A1* | 6/2014 | Koizumi et al. | 360/31 |

FOREIGN PATENT DOCUMENTS

| | | |
|---|---|---|
| JP | 4649519 B2 | 3/2011 |
| JP | 2013-229067 A | 11/2013 |

* cited by examiner

*Primary Examiner* — Paul Huber
(74) *Attorney, Agent, or Firm* — White & Case LLP

(57) ABSTRACT

According to one embodiment, a magnetic disk apparatus includes a main magnetic pole configured to apply a recording magnetic field to a recording medium, a recording coil configured to magnetize the main magnetic pole, a spin-torque oscillator adjacent to the main magnetic pole, and configured to generate a high frequency magnetic field, a recording current control circuit configured to supply a recording current to the recording coil, a driving current control circuit configured to supply a fixed driving current to the spin-torque oscillator, and an overshoot control circuit configured to control overshoot current of the recording current in proportion to the magnitude of the driving current after the recording current has reversed.

13 Claims, 5 Drawing Sheets

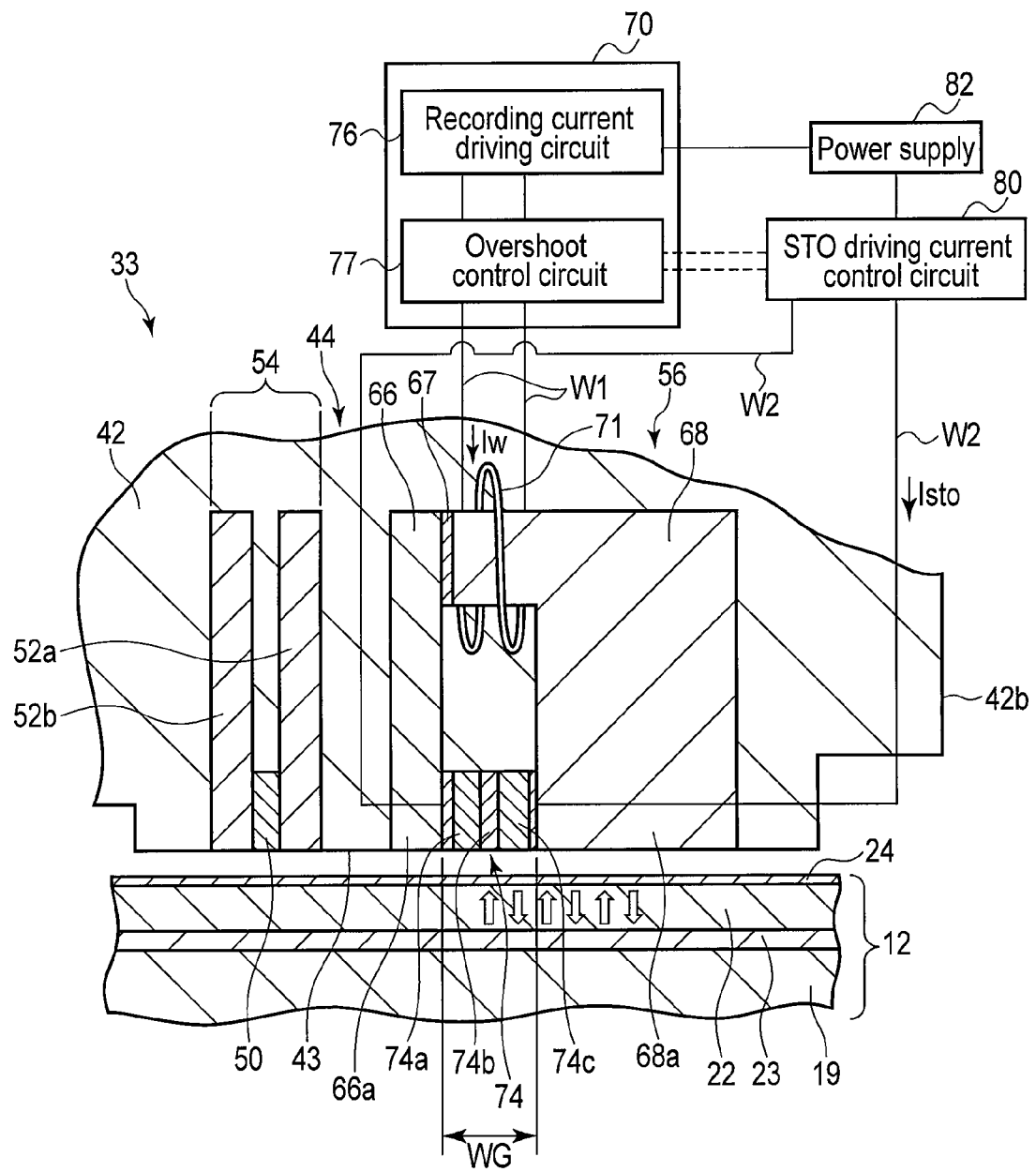
F I G. 3

F I G. 4A
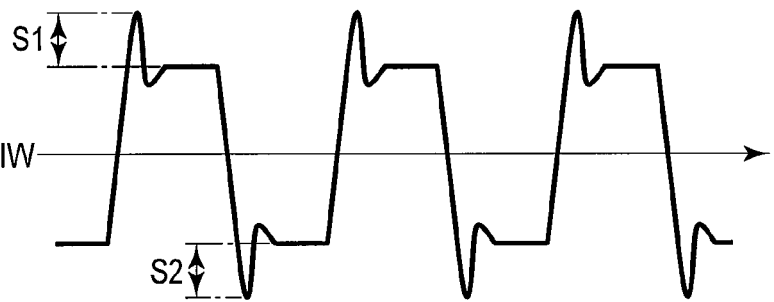
Recording current IW
F I G. 4B
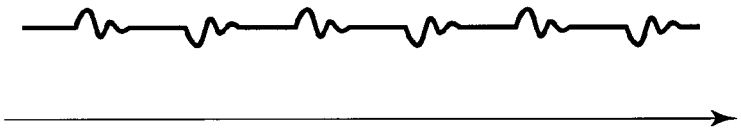
Spin-torque oscillator
driving current ISTO
F I G. 4C
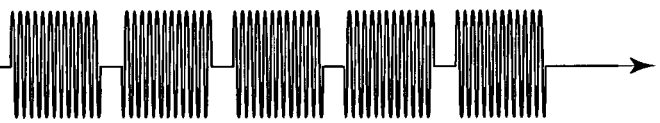
Oscillation behavior of
spin-torque oscillator
F I G. 5A
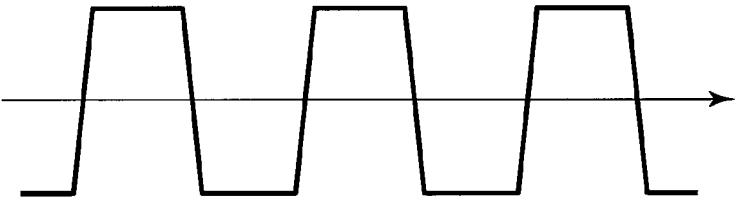
Recording current IW
F I G. 5B
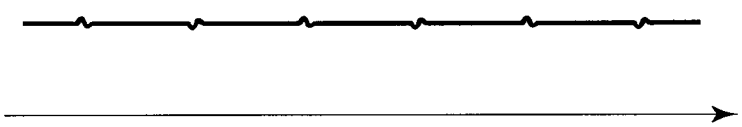
Spin-torque oscillator
driving current ISTO
F I G. 5C
Oscillation behavior of
spin-torque oscillator Recording current IW Spin-torque oscillator
driving current ISTO

MAGNETIC DISK APPARATUS

CROSS-REFERENCE TO RELATED APPLICATIONS

This application is based upon and claims the benefit of priority from Japanese Patent Application No. 2014-134094, filed Jun. 30, 2014, the entire contents of which are incorporated herein by reference.

FIELD

Embodiments described herein relate generally to a magnetic disk apparatus employing a microwave assist system.

BACKGROUND

A magnetic disk apparatus as an example of a disk apparatus incorporates a magnetic disk in a case, a spindle motor which supports and rotates the magnetic disk, and a magnetic head for reading/writing data from/to the magnetic disk.

In recent years, a magnetic head employing a microwave assist recording system is proposed for the purpose of improving recording density, in which a spin-torque oscillator is provided as a microwave oscillator near the main magnetic pole of the magnetic head and a high-frequency magnetic field is applied from the spin-torque oscillator to the magnetic recording layer of the magnetic disk. Furthermore, a magnetic disk apparatus employing a drive control system is proposed, in which a drive signal in a first level, which is a fixed or steady level, is continuously supplied to the spin-torque oscillator, and a drive signal in a second level, which is higher than the first level, is supplied to the spin-torque oscillator for a predetermined time after the recording signal has reversed in polarity.

However, it may happen that a high voltage should be unexpectedly applied to the spin-torque oscillator due to switching noises or the like while making rapid changes between a drive signal of the first level and a drive signal of the second level, causing the oscillations of the spin-torque oscillator to be unstable. In the worst case, the spin-torque oscillator will be damaged.

BRIEF DESCRIPTION OF THE DRAWINGS

FIG. 3 is a sectional view schematically illustrating in an enlarged manner the head portion of the magnetic head and a portion of the magnetic disk;

FIG. 4A is a graph illustrating a recording current waveform of the magnetic head;

FIG. 4B is a graph illustrating a spin-torque oscillator driving current waveform of the magnetic head;

FIG. 4C is a graph illustrating an oscillation behavior of the spin-torque oscillator;

FIG. 5A is a graph illustrating a recording current waveform of a magnetic head in a comparative example;

FIG. 5B is a graph illustrating a spin-torque oscillator driving current waveform of the magnetic head in the comparative example;

FIG. 5C is a graph illustrating an oscillation behavior of the spin-torque oscillator in the magnetic head in the comparative example;

DETAILED DESCRIPTION

Various embodiments will be described hereinafter with reference to the accompanying drawings. According to one embodiment, a magnetic disk apparatus generally comprises a main magnetic pole configured to apply a recording magnetic field to a recording layer of a recording medium; a recording coil configured to magnetize the main magnetic pole; a spin-torque oscillator, configured to generate a high frequency magnetic field, adjacent to the main magnetic pole and close to a medium-facing surface opposite the recording medium; a recording current control circuit configured to supply a recording current to the recording coil; a driving current control circuit configured to supply a fixed driving current to the spin-torque oscillator; and an overshoot control circuit configured to control, in proportion to a magnitude of the driving current, overshoot current of the recording current occurring after the recording current has reversed.

Now, a hard disk drive (HDD) related to an embodiment will be taken up as a magnetic disk apparatus and will be explained in detail with reference to the drawings.

First Embodiment

Figure 1:
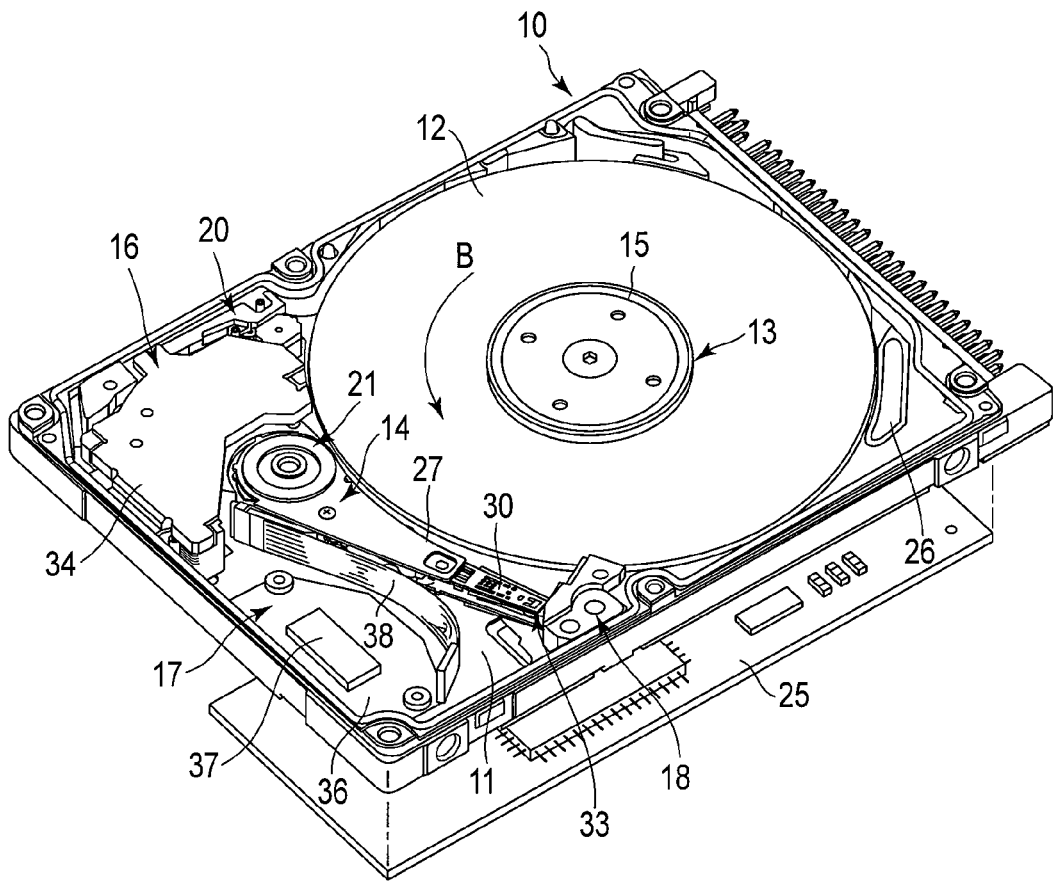
FIG. 1 is a perspective view of a magnetic disk apparatus (HDD) related to a first embodiment.
Figure 2:
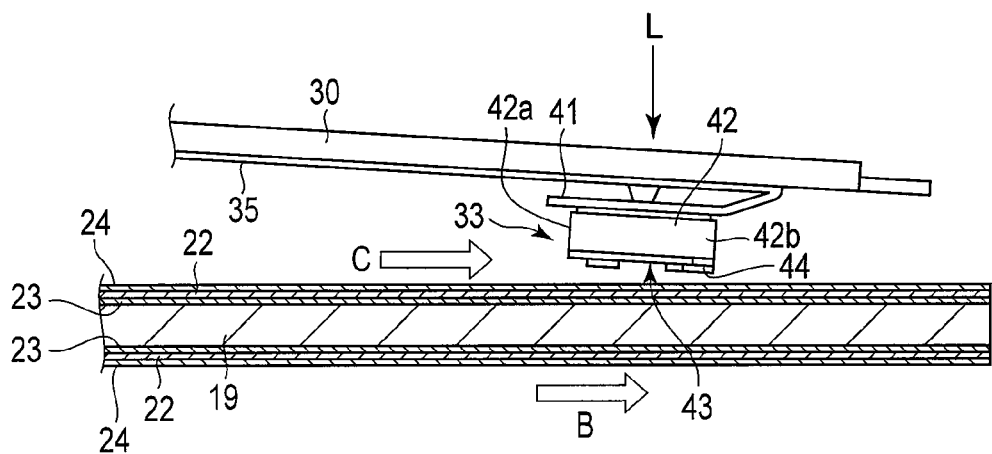
FIG. 2 is a side view of the HDD, illustrating a magnetic head, a suspension, and a recording medium.

FIG. 1 illustrates an HDD according to a first embodiment with a top cover removed to reveal its internal configuration, and FIG. 2 illustrates a magnetic head in a flying state. As illustrated in FIG. 1, the HDD comprises a housing 10. The housing 10 comprises a box-shaped base 11, whose upper end is open, and a rectangular plate-shaped top cover, which is not illustrated in the drawings. The top cover is screwed to the base with screws to close the open upper end of the base. As a result, the inside of the housing 10 is air-tightly maintained and can communicate with the outside for ventilation through a breather filter 26 alone.

A drive section and a magnetic disk 12 working as a recording medium are provided on the base 11. The drive section comprises a spindle motor 13 that supports and rotates the magnetic disk 12, a plurality (for example, two) of magnetic heads 33 that record and reproduce data on and from the magnetic disk 12, a head actuator 14 that supports the magnetic heads 33 for movement relative to the respective surfaces of the magnetic disk 12, and a voice coil motor (VCM) 16 that rotationally moves and positions the head actuator 14. Further, on the base 11 are provided a ramp loading mechanism 18 that holds each of the magnetic heads 33 in a position off the magnetic disk 12 when the magnetic heads 33 are moved to the outermost periphery of the magnetic disk 12, an inertia latch mechanism 20 that holds the head actuator 14 in a retracted position if the HDD is jolted, for example, and a board unit 17 having electronic components, including a conversion connector 37, for instance, mounted thereon.

A control circuit board 25 is screwed to the outer surface of the base 11, facing the bottom wall of the base 11. The control circuit board 25 controls through the board unit 17 the operation of the spindle motor 13, that of the VCM 16, and that of the magnetic heads 33.

As illustrated in FIG. 1 and FIG. 2, the magnetic disk 12 is made as a perpendicular magnetic recording medium. The magnetic disk 12 comprises, for instance, a substrate 19 which is made of a non-magnetic material and is shaped into a circular plate having a diameter of 2.5 inches (6.35 cm). On each surface of the substrate 19, a soft magnetic layer 23, serving as a foundation layer, a magnetic recording layer 22 and a protective film 24, both forming an upper layer portion, are successively stacked in this order.

As illustrated in FIG. 1, the magnetic disk 12 is fitted on the hub of the spindle motor 13 to be coaxial with the hub, is tightly held by a clamp spring 15 screwed to the upper end of the hub, and thereby is fixed to the hub. The magnetic disk 12 is made to rotate in a direction of an arrow B at a predetermined speed by the spindle motor 13 working as a drive motor.

As illustrated in FIG. 1 and FIG. 2, the head actuator 14 comprises a bearing portion 21 fixed on the bottom wall of the base 11, and arms 27 extending from the bearing portion 21. The arms 27 are located with a predetermined distance put in between, are in parallel with the surfaces of the magnetic disk 12, and extend in the same direction from the bearing portion 21. The head actuator 14 includes elastically deformable elongated sheet-shaped suspensions 30. The suspensions 30 individually have a proximal end that is fixed by spot welding or bonding to a corresponding one of the distal ends of the arms 27, so that they extend from the respective arms 27. The magnetic heads 33 are fixed through gimbal springs 41 to the distal ends of the suspensions 30. It should be noted that the head actuator 14 may be formed to have a so called E-block structure, in which the sleeve of the bearing portion 21 and the arms are formed as a single unitary body.

As illustrated in FIG. 2, each of the magnetic heads 33 comprises a slider 42 in the shape of a nearly rectangular parallelepiped and a head portion 44 for recording/reproducing provided at the outflow end (the trailing end) of the slider 42. The two arms 27 are parallel with each other with a predetermined distance therebetween. The suspensions 30 and the magnetic heads 33 attached to the arms 27 face the respective counterparts, with the magnetic disk 12 held in between.

Each of the magnetic heads 33 is electrically connected to the board unit 17 and the control circuit board 25 through a main FPC 38 of the board unit 17 and a relay flexible printed circuit board (an interconnection member) 35 fixedly extending over a corresponding one of the suspensions 30 and a corresponding one of the arms 27.

As illustrated in FIG. 1, the VCM 16 has a non-illustrated support frame, which extends from the bearing portion 21 in a direction opposite to the arms 27, and a voice coil supported by the support frame. In a condition that the head actuator 14 is incorporated in the base 11, the voice coil is between a pair of yokes 34 fixed on the base 11, and constitutes the VCM 16 along with the yokes and magnets fixed to the yokes.

The energization of the voice coil of VCM 16 while the magnetic disk 12 is rotating causes the head actuator 14 to rotationally move and the magnetic head 33 to move to be located on a desired track on the magnetic disk 12. At this moment, the magnetic head 33 radially moves over the magnetic disk 12 between its inner peripheral portion and its outer peripheral portion.

Now, the structure of the magnetic head 30 will be explained in detail. FIG. 3 is a sectional view illustrating in an enlarged manner the head portion 44 of the magnetic head 33 and a portion of the magnetic disk.

As illustrated in FIG. 2 and FIG. 3, the magnetic head 33 is structured as a flying type head, and comprises a slider 42 and a head portion 44. The slider 42 is formed of, for example, a sintered compact (AlTiC) of alumina and a titanium carbide. The head portion 44 is formed of layers of thin films.

The slider 42 has a rectangular disk facing surface (a medium facing surface, an air bearing surface [ABS]) 43 facing one surface of the magnetic disk 12. The slider 42 is kept flying by a predetermined amount from the surface of the magnetic disk 12 due to an air flow C generated between the disk surface and the disk facing surface 43 by the rotation of the magnetic disk 12. The direction of the air flow C coincides with the rotation direction B of the magnetic disk 12. The slider 42 is arranged with respect to the one surface of the magnetic disk 12 such that the longitudinal direction of the disk facing surface 43 is substantially aligned with the direction of the air flow C. The slider 42 has a leading end 42*a*, which is on the inflow side into which the air flow C flows, and a trailing end 42*b*, which is on the outflow side of which the air flow C flows out.

As illustrated in FIG. 3, the head portion 44 is formed as a separation type magnetic head, and comprises a magnetic recording head 56 and a reproducing head 54 formed at the trailing end 42*b* of the slider 42 in a thin-film process.

The reproducing head 54 comprises a magnetic film 50 exhibiting a magneto-resistance effect, and shield films 52*a* and 52*b* arranged on the trailing side and the leading side of this magnetic film 50 to sandwich the magnetic film 50. The respective lower ends of the magnetic film 50, and the shield films 52*a* and 52*b* are exposed at the disk facing surface 43 of the slider 42.

The recording head 56 is located on the trailing end 42*b* side of the slider 42 with respect to the reproducing head 54. As illustrated in FIG. 3, the recording head 56 comprises a main magnetic pole (a recording magnetic pole) 66 made of a high saturation magnetization material for generating a recording magnetic field perpendicular to the surface of the magnetic disk 12, a trailing shield (a shield magnetic pole) 68 confronting the trailing side of the main magnetic pole 66 with a gap (a write gap) in between, a recording coil 71 wound around a magnetic circuit (a magnetic core) including the main magnetic pole 66 and the trailing shield 68, and a microwave oscillator, such as a spin-torque oscillator 74, forming a part of the disk facing surface 43 between the distal end portion 68*a* of the trailing shield 68 and a distal end portion 66*a* which the main magnetic pole 66 has at the disk facing surface 43 side. When a signal is written to the magnetic disk 12, a recording current is flowed through the recording coil 71 to cause the main magnetic pole 66 to generate a magnetic flux.

The main magnetic pole 66 extends substantially perpendicularly to the one surface of the magnetic disk 12. The distal end portion 66*a* is tapered or narrowed down toward the disk surface. The distal end surface of the main magnetic pole 66 is exposed and is flush with the disk facing surface 43 of the slider 42. In the present embodiment, the width of the distal end portion 66*a* of the main magnetic pole 66 is substantially the same in length as the track width of the magnetic disk 12.

The trailing shield 68 is substantially L-shaped, and its distal end portion 68*a* is formed into an elongated rectangular shape. The distal end surface of the trailing shield 68 is exposed and is flush with the disk facing surface 43 of the slider 42. The trailing shield 68 is provided to efficiently close a magnetic path with the help of the soft magnetic layer 23 directly under the main magnetic pole 66. The leading side end surface of the distal end portion 68a extends along the track width of the magnetic disk 12. The leading side end surface faces and substantially parallels the trailing side end surface of the main magnetic pole 66 with a write gap WG in between. It is possible to provide side shields at the respective sides of the main magnetic pole 66 distant from each other in the track width direction. The provision of the side shields makes it possible to reduce a fringe magnetic field affecting to an adjacent truck, resulting in improvement in recording density of the truck width direction.

The trailing shield 68 is coupled through a nonconductive body 67 of $SiO_2$, for instance, to the main magnetic pole 66 at a position distant from the disk facing surface 43. The main magnetic pole 66 and the trailing shield 68 are electrically insulated by the nonconductive body 67.

The recording coil 71 is connected through a wire $W_1$ to a recording current control circuit 70. The recording current control circuit 70 is provided at the control circuit board 25 or the board unit 17 or a preamplifier IC arranged at that end of the main FPC 38 that is located at the relay flexible printed circuit board (interconnection member) 35 side. The recording current control circuit 70 comprises an overshoot control circuit 77 and a recording current driving circuit 76 connected to a power supply 82. The recording current driving circuit 76 supplies a recording current $I_W$ to the recording coil 71 in accordance with a recording signal or meeting the recording pattern applied from the control circuit board 25. The recording coil 71 magnetizes the main magnetic pole 66 and causes the main magnetic pole 66 to generate a recording magnetic field. When the recording current $I_W$ inverts, the overshoot control circuit 77 controls the overshoot of the recording current in proportion to the driving current of the spin-torque oscillator 74.

As illustrated in FIG. 3, the spin-torque oscillator 74 is provided within the write gap WG between the distal end portion 66a of the main magnetic pole 66 and the leading side end surface of the trailing shield 68. The lower end surface of the spin-torque oscillator 74 is exposed, constituting a portion of the disk facing surface 43 of the slider 42, and is positioned at almost the same height as the distal end surface of the main magnetic pole. Namely, the lower end surface of the spin-torque oscillator 74 is flush with the disk facing surface 43 of the slider 42, and is positioned almost parallel to the one surface of the magnetic disk 12.

The spin-torque oscillator 74 comprises a seed layer made of a non-magnetic conductive layer, a spin-injection layer (a first magnetic substance layer) 74a, an intermediate layer 74b, an oscillation layer (a second magnetic substance layer) 74c, and a cap layer made of a non-magnetic conductive layer. Theses layers are successively stacked from the main magnetic pole 66 side to the trailing shield 68 side in the mentioned order. The seed layer is formed to be in contact with the distal end portion 66a of the main magnetic pole 66. The cap layer is formed to be in contact with the leading side end surface of the trailing shield 68.

The oscillation layer 74c is made of such a material that has a soft magnetic property and a large saturation magnetic flux density, namely, Fe or Co or Ni, for instance. The intermediate layer 74b is made of a material having a long spin diffusion length, for example, Cu. The spin-injection layer 74a is made of, for instance, a Co/Ni artificial lattice which is high in coercivity and high in spin polarization rate. It is also possible to make the spin-injection layer 74a from a material having a smaller coercivity than the gap magnetic field which is generated during recording. It should be noted that the configuration is not limited to the above configuration in which the spin-injection layer 74a, the intermediate layer 74b, and the oscillation layer 74c are stacked in this order from the main magnetic pole side 66, but it is possible to stack the oscillation layer, the intermediate layer, and the spin-injection layer in this order from the main magnetic pole side 66.

The spin-torque oscillator 74 is connected through the main magnetic pole 66, the trailing shield 68, and wires $W_2$ to a spin-torque oscillator (STO) driving current control circuit 80. The STO driving current control circuit 80 is provided at the control circuit board 25 or the board unit 17 or a preamplifier IC arranged at an end of the relay flexible printed circuit board (interconnection member) 35 side of the main FPC 38, and is connected with the power supply 82 and the overshoot control circuit 77. The STO driving current control circuit 80 applies voltage from the power supply 82 to the main magnetic pole 66 and the trailing shield 68 under the control of the control circuit board 25, thereby causing a driving current $I_{STO}$ to serially pass through wire $W_2$, the main magnetic pole 66, the spin-torque oscillator 74, and the trailing shield 68. Namely, the STO driving current control circuit 80 causes a direct current to flow in the direction of the film thickness of the spin-torque oscillator 74. The passage of current rotates the magnetization of the oscillation layer 74c of the spin-torque oscillator 74, which makes it possible to generate a high-frequency magnetic field (a microwave). Thus, the spin-torque oscillator 74 applies the high-frequency magnetic field to the recording layer of the magnetic disk 12, and decreases the coercivity of the recording layer.

FIGS. 4A, 4B, and 4C are graphs illustrating (A) a recording current waveform, (B) an STO driving current waveform, and (C) the oscillation behavior of the spin-torque oscillator 74, all exhibited under the conditions that the overshoot $S_1$ of the recording current $I_W$ is set to 25 mA, which is ten times as great as the driving current of the STO driving current, when the recording current $I_W$ is set to 40 mA and the STO driving current $I_{STO}$ is set to 2.5 mA.

The recording current waveform exhibits such a waveform that the overshoot current will be superposed on the recording current waveform, whenever the recording current waveform reverses in polarity, and thereafter the recording current waveform returns to a fixed current of 40 mA, which is the set value. The overshoot current $S_1$ is so controlled as to be 25 mA. Therefore, the maximum value which the recording current waveform exhibits after every inversion has a peak of 65 mA. At this moment, the STO driving current waveform exhibits the set value of 2.5 mA at those portions where the recording current $I_W$ will not reverse. However, the superposition of the crosstalk noise (current) occurring between wires $W_1$ and $W_2$ when the recording current reverses causes a level fluctuation between a maximum absolute value of about 3 mA and a minimum absolute value of about 2.3 mA. Concerning the oscillation behavior of the spin-torque oscillator 74 at the moment, it promptly oscillates after the recording current $I_W$ has reversed and the oscillation delay can hardly occur after the recording current has reversed. It should be noted that the overshoot control circuit 77 controls the negative side undershoot current $S_2$ in common with the positive side overshoot current $S_1$ in the present embodiment.

FIGS. 5A, 5B, and 5C illustrate as a comparative example (A) a recording current waveform, (B) an STO driving current waveform, and (C) the oscillation behavior of the spin-torque oscillator, all exhibited under the conditions that the STO driving current control circuit 80 and the overshoot control circuit 77 are disconnected and overshoot of the recording current $I_W$ will be prevented. The recording current $I_W$ and the STO driving current $I_{STO}$ are respectively set to 40 and 2.5 mA.

As illustrated in FIGS. 5A, 5B, and 5C, the recording current $I_W$ in the comparative example exhibits a current waveform that scarcely has overshoot at the time of polarity inversion. The STO driving current waveform shows that the crosstalk noise between wires $W_1$ and $W_2$ is slightly superposed whenever the recording current $I_W$ reverses in polarity, but its magnitude is no greater, than about 0.1 mA. It will be understood that the oscillation behavior of the spin-torque oscillator 74 at that moment exhibits that the oscillation intensity gently rises and the oscillation frequency gradually shifts from a low value to a high value. Therefore, it will be understood that it takes time for a high-frequency magnetic field to occur after the reversal of the recording magnetic field in the comparative example.

As having been explained above, the magnetic disk apparatus in the present embodiment makes it possible to cause the spin-torque oscillator 74 to promptly oscillate without incurring delay in oscillation after the recording current has reversed through the provision of the overshoot control circuit 77, which adjusts the overshoot current in proportion to the driving current of the spin-torque oscillator 74 whenever the recording current $I_W$ reverses. Therefore, the spin-torque oscillator will oscillate immediately after the recording current inversion even in the case where the transfer rate increases and the recording frequency becomes high, achieving making a favorable recording with the assistance of a stable high-frequency.

Figure 6:
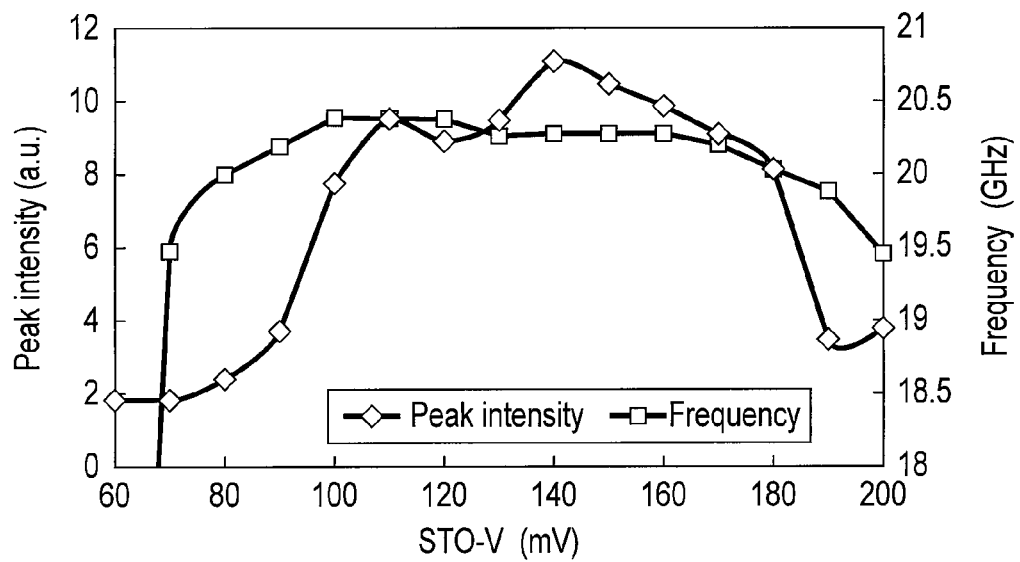
FIG. 6 is a view illustrating the relationship between the oscillation intensity and the oscillation frequency in a case where the oscillation behavior of the spin-torque oscillator is measured under the condition that the driving current is changed in the first embodiment.

FIG. 6 illustrates the relationship between the oscillation intensity and the oscillation frequency in a case where the oscillation behavior of the spin-torque oscillator is measured under the condition that the STO driving current $I_{STO}$ is changed. The spin-torque oscillator 74 used here was set to have a resistance of 50Ω, and the measurement was carried out by changing the STO driving current $I_{STO}$ from 1.2 to 4 mA.

The graph indicates that the drive voltage range where the peak intensity will be high and the oscillation frequency will be stable is about 100 to 180 mV. Here, let the drive voltage be 140 mV, which is the midpoint of the drive voltage range where a stable oscillation will be obtained, then the range where a stable oscillation will be obtained will be almost a rage of 140 mV (2.5 mA)±30%. Therefore, in order to maintain a stable oscillation even if the crosstalk noise between the wires is superposed onto the STO driving current $I_{STO}$, the components of the superposition (current) should be confined to ±30% of the set driving current. A deviation from this range causes an oscillation frequency to deviate or prevents the sufficient oscillation intensity.

As having been explained above, the present embodiment makes it possible to obtain a magnetic disk apparatus that makes faster and stable microwave assisted magnetic recordings.

Now, an HDD related to another embodiment will be explained. In the following explanation of another embodiment, those portions that are the same as those in the first embodiment will be given the same reference numerals as the already explained portions and their detailed explanation will be omitted. The detailed explanation will be mainly given to those that are different from the first embodiment.

Second Embodiment

Figure 7:
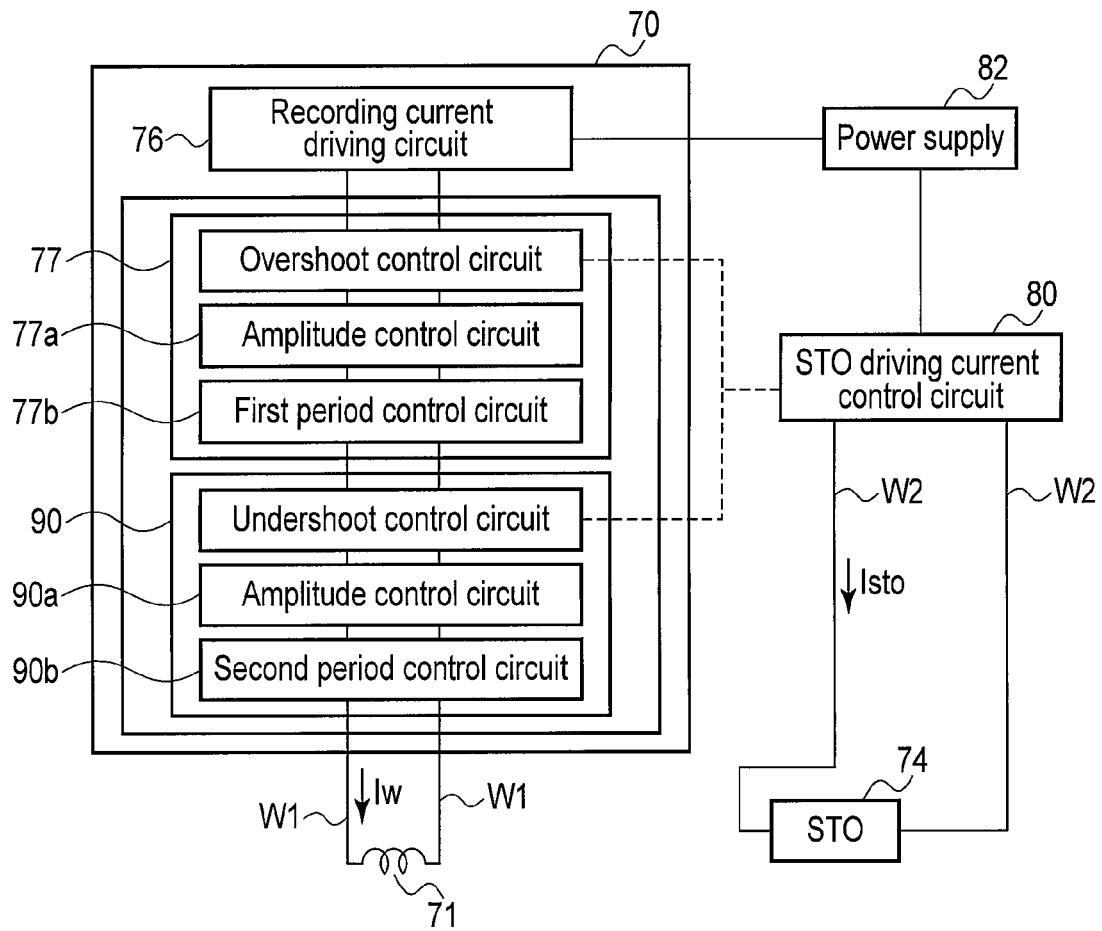
FIG. 7 is a block diagram illustrating an overshoot control circuit of a magnetic disk apparatus related to a second embodiment.

FIG. 7 is a block diagram of an HDD in a second embodiment schematically illustrating the recording current control circuit of a recording head and the spin-torque oscillator driving current control circuit.

In the second embodiment, the HDD is configured to separately control a positive side overshoot current and a negative side undershoot current of the recording current $I_W$ at the time of polarity inversion. As illustrated in FIG. 7, the HDD comprises the recording current control circuit 70, which supplies the recording current through wires $W_1$ to the recording coil 71 of the magnetic head, and the spin-torque oscillator driving current control circuit 80, which supplies the driving current through wires $W_2$ to the spin-torque oscillator (STO).

The recording current control circuit 70 comprises a recording current driving circuit 76, which is connected to a power supply 82, an overshoot control circuit 77, which controls the overshoot current $S_1$ in proportion to the STO driving current, and an undershoot control circuit 90, which controls the undershoot current $S_2$ in proportion to the STO driving current. The overshoot control circuit 77 comprises a first amplitude control circuit 77a, which adjusts the amplitude of the overshoot current, and a first period control circuit 77b, which controls a sustaining period (duration) $T_1$ of the overshoot current. In the same way, the undershoot control circuit 90 comprises a second amplitude control circuit 90a, which adjusts the amplitude of the undershoot current, and a second period control circuit 90b, which controls a sustaining period (duration) $T_2$ of the undershoot current. Whenever the recording current reverses, the recording current control circuit 70 switches between the overshoot control circuit 77 and the undershoot control circuit 90, thereby controlling the recording current.

Figure 8A:
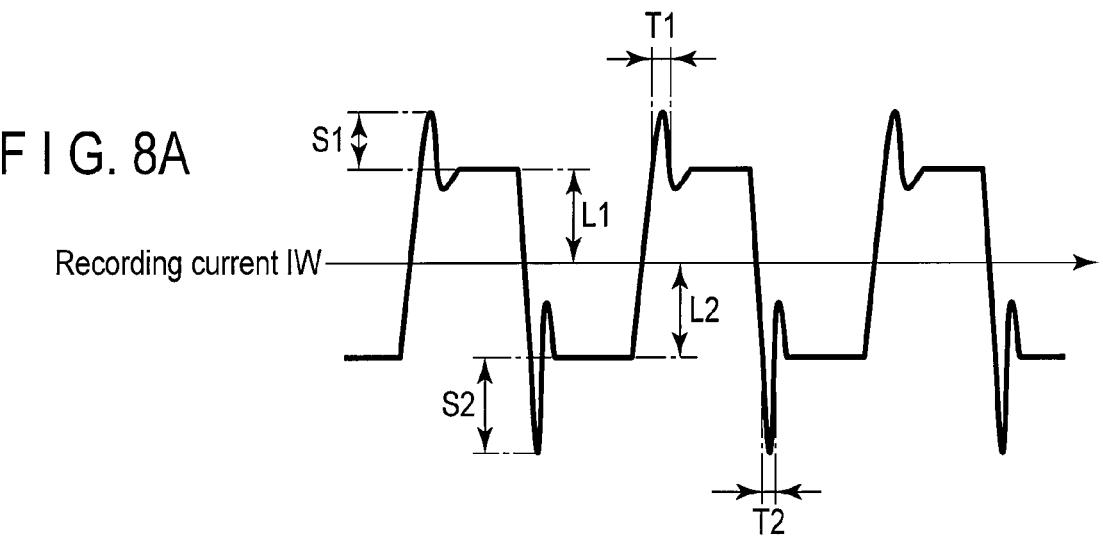
FIG. 8A is a graph illustrating a recording current waveform of a magnetic head in the second embodiment.
Figure 8B:
FIG. 8B is a graph illustrating a spin-torque oscillator driving current waveform of the magnetic head in the second embodiment.

FIGS. 8A and 8B are graphs illustrating (A) a recording current waveform, and (B) an STO driving current waveform, both exhibited under the conditions that the recording current $I_W$ is set to 40 mA and the STO driving current is set to 2.5 mA. In the case of the undershoot current of the recording current $I_W$, a crosstalk noise (current) is superposed onto the spin-torque oscillator (STO) driving current $I_{STO}$ and produces the undershoot current which is followed by ringing. It is the return part of the ringing that contributes toward giving a boost to a spin-torque oscillator. Therefore, it is preferable that the undershoot current $S_2$ is set greater than the overshoot current $S_1$.

A crosstalk noise (current) causing the undershoot current upon its superposition contributes toward the lowering the STO driving current $I_{STO}$. Therefore, the spin-torque oscillator 74 will not be damaged even if the undershoot current $S_2$ increases. However, the oscillation boosting effect will be delayed when the ringing following the undershoot current is delayed. Therefore, it is preferable that the sustaining period (the duration) $T_2$ of the undershoot current is set shorter than the sustaining period (the duration) $T_1$ of the overshoot.

The recording current control circuit 70 comprises an overshoot control circuit (for coping with a positive polarity) 77 and an undershoot control circuit (for coping with a negative polarity) 90, and selectively uses them in accordance with the direction of the recording current. The first amplitude control circuit 77a of the overshoot control circuit 77 controls the amplitude of the overshoot current (an amount exceeding the fixed state) $S_1$ in such a manner that the crosstalk noise (current), which causes the overshoot current and is superposed onto the STO driving current $I_{STO}$, should be ±30% of the set STO driving current.

The second amplitude control circuit 90a of the undershoot control circuit 90 sets the amplitude of the undershoot current (an amount lower than the fixed state) $S_2$ to be, for instance, 40 to 60% greater than the amplitude of the overshoot current $S_1$ whenever the recording current $I_W$ reverses. Furthermore, the second sustaining period control circuit 90b of the undershoot control circuit 90 sets the sustaining period $T_2$ of the undershoot current to be shorter than the sustaining period $T_1$ of the overshoot current, and it is desirable to set the T2 to, for instance, ⅔ of the $T_1$.

Thereby the component of increasing the STO driving current $I_{STO}$ in the case of overshoot of the recording current $I_W$ will be substantially the same as the component of increasing the STO driving current $I_{STO}$ in the case of undershoot, resulting in the favorable spin-torque oscillation regardless of the direction of the recording current.

The remaining structures of the HDD in the second embodiment are the same as those in the aforementioned first embodiment. The second embodiment structured as described above makes it possible to obtain a magnetic disk apparatus that makes faster and stable microwave assisted magnetic recordings than the recording head of the first embodiment In the second embodiment, it is possible to set the recording current $I_W$ in such a manner that the positive current level $L_1$ and the negative current level $L_2$ are different from each other, namely, $L_1 > L_2$ or $L_1 < L_2$.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, a place where the spin-torque oscillator is located is not limited to the trailing side of the main magnetic pole, but may be at the leading side of the main magnetic pole. The magnitudes of the recording current, driving current, overshoot current and undershoot current of the recording current, and the sustaining periods are not limited to the values illustrated in the above embodiments, but may be changed as deemed fit.

What is claimed is:

1. A magnetic disk apparatus comprising:
   a main magnetic pole configured to apply a recording magnetic field to a recording layer of a recording medium;
   a recording coil configured to magnetize the main magnetic pole;
   a spin-torque oscillator, configured to generate a high frequency magnetic field, adjacent to the main magnetic pole and close to a medium-facing surface opposite the recording medium;
   a recording current control circuit configured to supply a recording current to the recording coil;
   a driving current control circuit configured to supply a fixed driving current to the spin-torque oscillator; and
   an overshoot control circuit configured to control, in proportion to a magnitude of the driving current, overshoot current of the recording current occurring after the recording current has reversed.

2. The magnetic disk apparatus of claim 1, which further comprises:
   a first wire configured to connect the recording coil and the recording current control circuit; and
   a second wire configured to connect the spin-torque oscillator and the driving current control circuit,
   the driving current supplied to the spin torque oscillator including a portion higher than the absolute value of the fixed driving current because of level fluctuation caused by crosstalk from the first wire to the second wire at a moment of applying the recording current.

3. The magnetic disk apparatus of claim 2, wherein the overshoot control circuit is configured to control the overshoot current of the recording current in such a manner that a level fluctuation of the driving current caused by the crosstalk is within ±30% of the fixed driving current.

4. The magnetic disk apparatus of claim 1, wherein the recording current control circuit comprises the overshoot control circuit configured to control in proportion to the magnitude of the driving current the overshoot current occurring after the recording current has reversed to a positive current; and an undershoot control circuit configured to control, in proportion to the magnitude of the driving current, undershoot current occurring after the recording current has reversed to a negative current.

5. The magnetic disk apparatus of claim 4, wherein the undershoot control circuit is configured to set the undershoot current greater than the overshoot current.

6. The magnetic disk apparatus of claim 5, wherein the overshoot control circuit comprises a first sustaining period control circuit configured to control a sustaining period of the overshoot current, and the undershoot control circuit comprises a second sustaining period control circuit configured to set sustaining period of the undershoot current shorter than the sustaining period of the overshoot current.

7. The magnetic disk apparatus of claim 4, wherein the overshoot control circuit comprises a first sustaining period control circuit configured to control a sustaining period of the overshoot current, and the undershoot control circuit comprises a second sustaining period control circuit configured to set a sustaining period of the undershoot current shorter than the sustaining period of the overshoot current.

8. The magnetic disk apparatus of claim 2, wherein the recording current control circuit comprises: the overshoot control circuit configured to control in proportion to the magnitude of the driving current the overshoot current occurring after the recording current has reversed to a positive current; and
   an undershoot control circuit configured to control, in proportion to the magnitude of the driving current, undershoot current occurring after the recording current has reversed to a negative current.

9. The magnetic disk apparatus of claim 8, wherein the undershoot control circuit is configured to set the undershoot current greater than the overshoot current.

10. The magnetic disk apparatus of claim 9, wherein the overshoot control circuit comprises a first sustaining period control circuit configured to control a sustaining period of the overshoot current, and the undershoot control circuit comprises a second sustaining period control circuit configured to set a sustaining period of the undershoot current shorter than the sustaining period of the overshoot current.

11. The magnetic disk apparatus of claim 3, wherein the recording current control circuit comprises: the overshoot control circuit configured to control in proportion to a magnitude of the driving current the overshoot occurring after the recording current has reversed to a positive current; and
   an undershoot control circuit configured to control, in proportion to the magnitude of the driving current, undershoot current occurring after the recording current has reversed to a negative current.

12. The magnetic disk apparatus of claim 11, wherein the undershoot control circuit is configured to set the undershoot current greater than the overshoot current.

13. The magnetic disk apparatus of claim 12, wherein the overshoot control circuit comprises a first sustaining period control circuit configured to control a sustaining period of the overshoot current, and the undershoot control circuit comprises a second sustaining period control circuit configured to set a sustaining period of the undershoot current shorter than the sustaining period of the overshoot current.

* * * * *